United States Patent [19]

Sager

[11] Patent Number: 5,680,644
[45] Date of Patent: Oct. 21, 1997

[54] LOW DELAY MEANS OF COMMUNICATING BETWEEN SYSTEMS ON DIFFERENT CLOCKS

[75] Inventor: David J. Sager, Acton, Mass.

[73] Assignee: Digital Equipment Corporation, Maynard, Mass.

[21] Appl. No.: 331,780

[22] Filed: Oct. 31, 1994

[51] Int. Cl.$^6$ .................................................. G06F 13/00
[52] U.S. Cl. .................................................. 395/872
[58] Field of Search .................. 395/250, 200.08, 395/200.13, 200.19, 872

[56] References Cited

U.S. PATENT DOCUMENTS

| | | | |
|---|---|---|---|
| 4,375,078 | 2/1983 | Thoma | 395/250 |
| 4,502,114 | 2/1985 | Krikor et al. | 395/250 |
| 4,819,201 | 4/1989 | Thomas et al. | 395/250 |
| 4,860,193 | 8/1989 | Bentley et al. | 395/250 |

Primary Examiner—William M. Treat
Assistant Examiner—Patrice L. Winder
Attorney, Agent, or Firm—Kenneth F. Kozik

[57] ABSTRACT

The present invention makes use of synchronizers in transmitting the data from the transmitting system to the receiving system, but in a way so that the synchronizer can be provided with as long a settling time as the designer chooses, in order to provide for as low a rate of synchronizer failure as the designer chooses, and at the same time allowing a low delay from the time when the transmitting system knows it is to transmit a word of data until when that data word is usable within the receiving system. In the present invention the delay in the data path is not related to the settling time provided for the synchronizers, so there is no trade off situation between low failure rate and short delay, as there is in the prior art. This leaves the designer free to design for extremely low error rate due to synchronizer failure, and a big safety margin in the settling time, with no ill effect on performance. The cycle time for the data transmission is in no way affected by synchronizer settling time so it may be very fast and at the same time the rate for synchronizer failure may be as low as desired.

3 Claims, 8 Drawing Sheets

LOW DELAY MEANS OF COMMUNICATING BETWEEN SYSTEMS ON DIFFERENT CLOCKS

BACKGROUND OF THE INVENTION

This invention relates to computer systems, and more particularly to a system for communicating between computer systems on different clocks.

As it is known in the art, it is generally necessary to transmit data from one logic subsystem of a computer to another logic subsystem of the same or different computer at high speed. Several problems can occur when completing such a data transfer.

It may be that a clock that runs the transmitting system is different than and uncorrelated with the clock that runs the receiving system. The two clocks may be at different frequencies, that may have no simple relationship to each other. Moreover, at the time of the design of the receiving system it may not be known what the frequency of the transmitting system clock will be. The transmitting and receiving systems are therefore asynchronous with respect to each other.

Several approaches have been utilized in the prior art to communicate between a transmitting system and a receiving system having different clocks. Most of these approaches transmit the data from the transmitting system to the receiving system by use of a synchronizer.

If it is required to sample the state of an input signal at a certain time and then hold this state for a period of time, for example for a clock cycle, some kind of gated or triggered state (storage) device must be used. Triggered or gated state devices have critical time window in the vicinity of the time at which they sample the input signal for storage. The critical windows starts a setup time before the triggering event (usually a state change in the trigger signal) and lasts until a hold time after the triggering event. The setup time and the hold time are parameters specific to the particular device. The state device will operate correctly if the input signal remains stable at a valid logic state (either logic 0 or logic 1 but not an intermediate value) throughout the critical time window. It has been observed with many state devices that if the input signal is not stable at a valid logic state during the critical window that then the device may not operate correctly. In particular, the output of the device may fail to become stable at a valid logic state, with varying probabilities, for quite a long time after the device is triggered. Devices have been observed to have outputs oscillate for quite a long time or have output voltages that remain at an intermediate voltage between logic 0 and logic 1 for quite a long time before settling to one or the other. This phenomenon has been called metastability or "synchronizer failure."

It is theoretically believed that it is not possible to build a triggered or gated state device that is not susceptible to synchronizer failure if the input signal is not stable at a valid logic level throughout some non-vanishing critical time period around the sample time. Hence, all such state devices are believed to exhibit synchronizer failure.

It is also theoretically believed that the time it takes for the output of a state device to become stable at a valid logic state when synchronizer failure has occurred is a probabilistic thing. Most probably, the device will "settle" or "resolve" in a short time; but it could be a long time with less probability. Current theory is that there is no upper bound on the resolving time of any such device, but the probability of observing very long settling times becomes exceedingly small.

State devices that, because of their application, are susceptible to synchronizer failure are called synchronizers. Any gated or triggered state device placed in a system so that it cannot be guaranteed that its inputs will be stable throughout its critical time is a synchronizer.

If an input to a logic system can change state at times that are not controlled relative to the clock events in the system, then many of the state devices in the system may become synchronizers, and be subject to synchronizer failure. This results in the system in general having unreliable operation. For this and other reasons, it is common practice to place a synchronizer intentionally in the path of such a signal before it gets to the rest of the system. If this intentional synchronizer resolves the signal, then the rest of the system will be free of any synchronizer problems. Good common practice would then be to provide the intentional synchronizer with a very long time for settling. This would then provide that there will be a non-zero but very small probability of system failure.

The synchronizer would be placed either in the actual data path, or else the data path would be buffered and a signal that indicates that the data is now ready would pass through the synchronizer. One problem with this use of synchronizers is that to have a low rate of errors in the system due to synchronizer failure, there must be a long delay from the time that the transmitting system knows that it is to transmit a data word until the time when the receiving system could make use of that data word.

SUMMARY OF THE INVENTION

In accordance with the present invention, a system for communicating between a transmitting system and a receiving system is provided, each system having a different clock, comprising buffer means for providing storage for a plurality of data words, means, coupled to said buffer means, for providing a detected signal when said buffer means is loaded with a data word, synchronizer means for synchronizing the detected signal, means for providing a new data signal indicating that one of the plurality of data words has been loaded into said buffer means, and means for receiving the one of said plurality of data words from said buffer means in response to said generated new data signal.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

DESCRIPTION OF THE PREFERRED EMBODIMENTS

Figure 1:
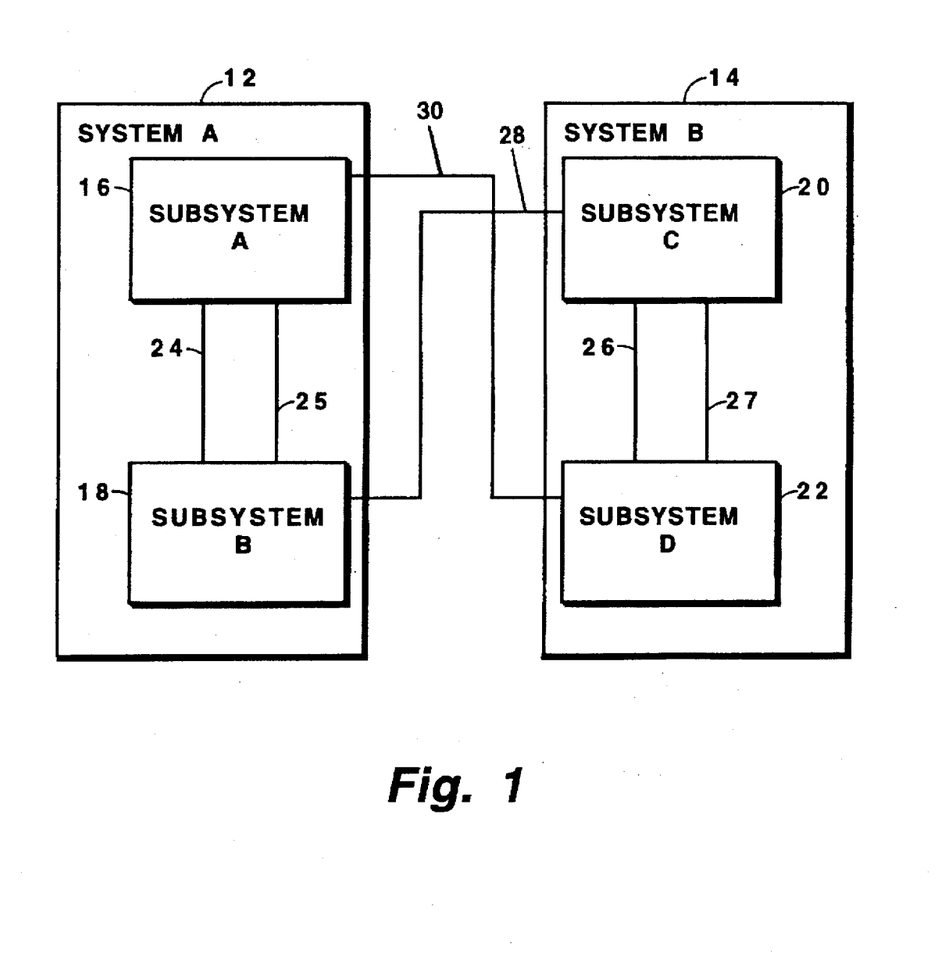
FIG. 1 is a block diagram of an exemplary computer system showing communication between subsystems.

Referring to FIG. 1, two computer systems 12 and 14 are shown to include a subsystem 16, a subsystem 18, a subsystem 20, and a subsystem 22, respectively. Data words generated from subsystem 16 and received by subsystem 18 along data path 24, while data words generated from subsystem 18 and received by subsystem 16 along data path 25. Data words generated by subsystem 20 may be received by subsystem 22 along data path 26, while data words generated from subsystem 22 may be received by subsystem 20 along data path 27. As is also seen in FIG. 1, data words may also be generated by system 12 and received by system 14 along data path 30. Furthermore, data words may be generated by system 14 and received by system 12 along data path 28. The speed at which any given system or subsystem generates or receives data words along a data path is dictated by a clock of the respective system or subsystem. The clocks of the respective systems and subsystems typically run at different frequencies and generally have no simple relationship to each other.

Figure 2:
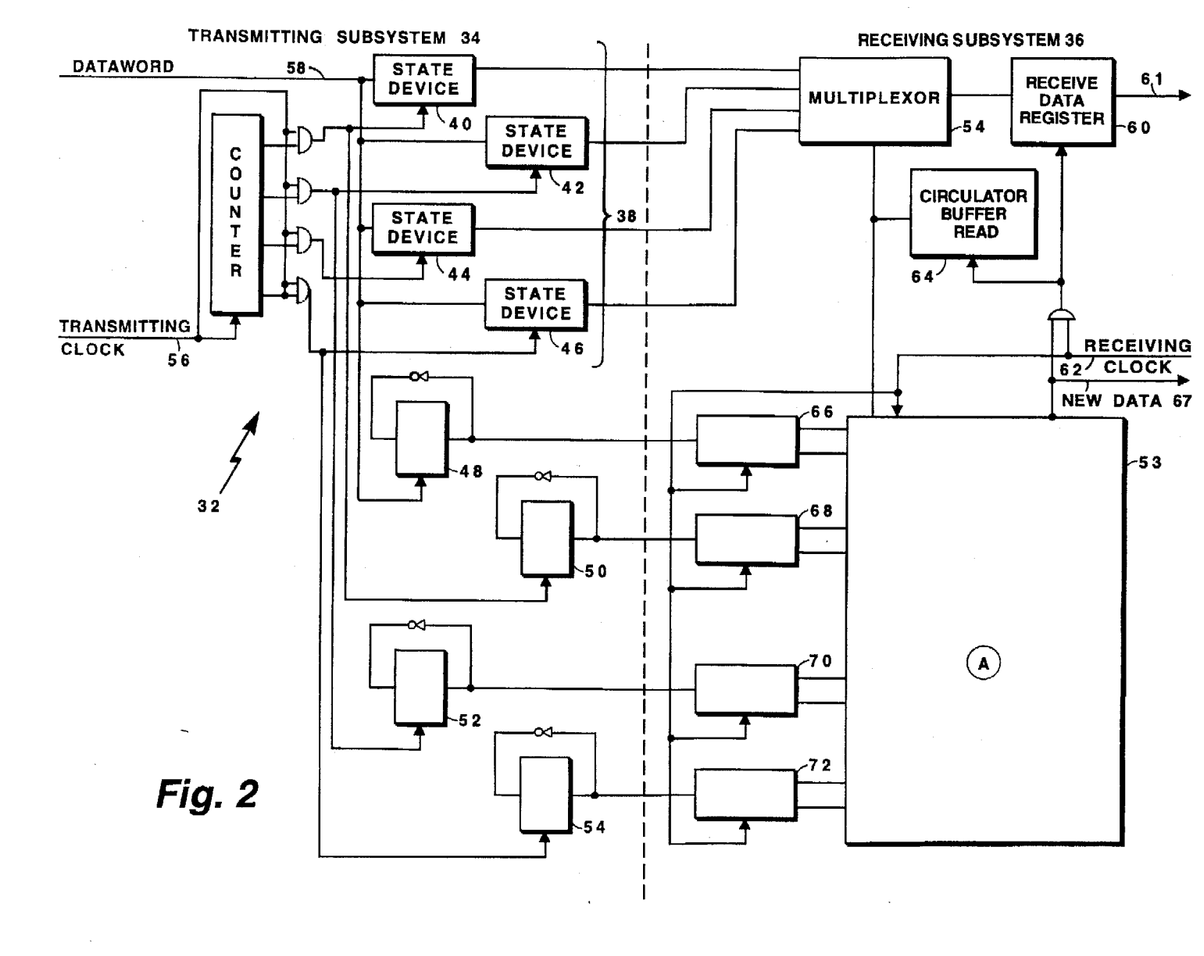
FIG. 2 is a block diagram of two computer subsystems in accordance with the present invention.

This present invention provides a means to synchronize data flowing, for example, along a data path 28, between the subsystem A 16 and the subsystem D 22, for example. Referring to FIG. 2, a data path 32 is shown to include a transmitting subsystem 34 and a receiving subsystem 36. The transmitting subsystem 34 includes a circular buffer 38 for storage of data words. The circular buffer 38 should have three data words capacity as a practical lower limit. However, four data words is a very convenient number. Here the circular buffer includes a plurality of state devices for here storing a capacity of four data words. Each data word in the circular buffer 38 is stored in a state device number 40, 42, 44, and 46, respectively. In addition to the aforementioned circular buffer 38, the transmitting subsystem 34 further includes a plurality of one bit wide sense registers, 48, 50, 52, and 54, respectively.

Each sense register is associated with a corresponding state device in the circular buffer 38, and arranged to be a toggle, that is, each time a data word is loaded into one of the state devices of the circular buffer 38, the corresponding sense register inverts its previous state. These sense registers 48, 50, 52, and 54 provide an indication of when the contents of the state devices 38, 40, 42, and 44 have changed.

Corresponding to each register 40, 42, 44, and 46 in the circular buffer 38 is another state device called a sense register 48, 50, 52, and 54, respectively. A sense register, 48, for example, is only one bit wide and is arranged to be a toggle, i.e., when it is triggered by selected transmitting system clock events 56, it inverts its previous state. Each sense register (48, 50, 52, and 54) is triggered when its corresponding register (40, 42, 44, and 46) in the circular buffer 38 is loaded and with the very same transmitting system clock event 56. Hence, a change in the state of a sense register is exactly an indication that the corresponding register in the circular buffer 38 was loaded, and it identifies the exact transmitting system clock event 56 that did it.

As also shown, the receiving subsystem 36 includes a multiplexer 54 having inputs coupled to the outputs of the circular buffer 38. The transmitting subsystem 34 loads a data word 58 into the circular buffer 38 on each transmitting system clock event 56. Data words 58 are loaded one at a time in locations respectively numbered 40, 42, 44, and 46 of the circular buffer 38. These locations are each sized to receive one data word 58. After the word is loaded into location 46, then location 40 is loaded again. All of the words of the circular buffer 38 are available to the receiving subsystem 36 through the multiplexer 54 which selects a single data word 58 at a time. The multiplexer 54 is under the control of the receiving subsystem 36. From the multiplexer 54, the data word 58 moves to a state device in the receiving subsystem 36 called a receive data register 60. The receive data register 60 is a part of the receiving subsystem 36 and is therefore synchronous with the rest of the receiving subsystem 36. The receiving subsystem 36 uses the multiplexer 54 to read words out of the circular buffer 38 one at a time, in the same order that they were written, loading one word at a time into the Receive Data Register 60 on a receiving system clock event 62.

Here it is assumed that the clock frequency of the receiving subsystem 36 is greater than or equal to the clock frequency of the transmitting subsystem 34. This permits the receiving subsystem 36 to accept all data words from the transmitting subsystem 34 when the transmitting subsystem 34 sends one word per transmitting clock cycle and the receiving subsystem 36 receives, at most, one word per receiving clock cycle. The transmitting subsystem 34 inserts a word into the circular buffer 38 every transmitting clock cycle 56 and the receiving subsystem 36 withdraws a word from the circular buffer 38 in some receiving clock cycles 62 and does not in others. Over the long run, the rate of withdrawing data from the circular buffer 38 substantially matches the rate at which it is put in.

The multiplexer 54 of the receiving subsystem 36 is controlled by the circular buffer read counter 64. At the end of a receiving system clock cycle 62 in which data is withdrawn from the circular buffer 38 the circular buffer read counter 64 is incremented to be ready to get data from the next location in the circular buffer 38. If no data is to be withdrawn in a particular receiving system clock cycle 62, the circular buffer read counter 64 is not incremented at the end of the cycle but retains its previous state.

The Receive Data Register 60 captures the data from the Circular buffer 38 at the clock event at the end of a receiving system clock cycle 62 in a cycle in which data is withdrawn from the circular buffer 38. A signal called "new data" 67 is asserted in the receiving subsystem 36 during a cycle in which data is withdrawn from the circular buffer 38. It is the assertion of this new data signal 67 which causes the circular buffer read counter 64 to increment and the Receive Data Register 60 to capture the data at the end of this cycle. Assertion of "new data" 67 may be used by any other function in the receiving subsystem 36 to identify cycles in which a new data value 61 has been obtained.

The path from a selected one of the registers 40, 42, 44, and 46, respectively, in the circular buffer 38 through the multiplexer 54 and finally to the Receive Data Register 60 has some delay called the "capture delay". "Capture delay" includes the time after the transmitting system clock event 56 when the new data written into a register in the circular buffer 38 will be available at the output of that register, as well as the delay to propagate through the multiplexer 54. In addition the capture delay includes the delay to reach the receive data register 60, the setup time of the receive data register 60, and the worst case clock jitter and skew in the transmitting subsystem 34 and the worst case clock jitter and skew in the receiving subsystem 36.

There are two requirements to correctly capture data from the circular buffer 38 in the Receive Data Register 60. The first requirement is that the actual time from the transmitting system clock event 56 that loads a data word 58 into a register (40, 42, 44, or 46) in the circular buffer 38, to the receiving system clock event 62 that captures that data word 58 in the Receive Data Register 60 is longer than the Capture Delay. Ideally a designer would like to load every data word into the Receive Data Register 60 with the first receiving system clock event 62 that satisfies this condition. It will not be possible to always do this. The circuitry 53 that generates the signal "new data" 67 can be designed in several manners. High quality designs will usually achieve this and in the remaining cases data will go into the receive data register 60 in the cycle following the ideal one. Low quality designs will more frequently load data in the receive data register 60 in a cycle later than the ideal one and perhaps sometimes load the data in a cycle following the ideal one by more than just one cycle.

The second requirement is that, in the worst case, the data in a register 40, 42, 44, or 46 in the circular buffer 38 must not be lost due to writing new data into this same location in the circular buffer 38 before the data has been successfully captured in the Receive Data Register 60. This requirement is satisfied by having a sufficient number of registers in the circular buffer 38. The required number depends on the quality with which the signal "new data" 67 is produced, and will be discussed subsequently.

The next concern is how to make the signal "new data" 67 so that data will be loaded into the Receive Data Register 60 in a receiving system clock event 62 at least a Capture Delay after the transmitting system clock event 56 that loaded it into the Circular buffer 38. The designer will load the data in the earliest receiving system cycle 62 in which he can be certain of satisfying this condition.

A sense register (48, for example) is only one bit wide and is arranged to be a toggle, i.e., when it is triggered by selected transmitting system clock events 56, it inverts its previous state. Each sense register (48, 50, 52, and 54) is triggered when its corresponding register (40, 42, 44, and 46) in the circular buffer 38 is loaded and with the very same transmitting system clock event 56. Hence, a change in the state of a sense register is exactly an indication that the corresponding register in the circular buffer 38 was loaded, and it identifies the exact transmitting system clock event 56 that did it.

As mentioned earlier, the transmitting subsystem 34 contains a plurality of state devices 38 and sense registers 48, 50, 52, and 54. Each sense register 48, 50, 52, and 54 drives a synchronizer 66, 68, 70, and 72, respectively, that is clocked with the receiving system clock. For a good quality design the synchronizers should sample the sense register every half cycle of the receiving subsystem 36. For a lower quality design a designer can make it once every cycle and make the appropriate simplification in what follows. The synchronizers can be pipelined synchronizers or barrel synchronizers. The barrel synchronizers are preferred because they provide more settling time per latch. The delay through the synchronizers can be as long as the designer wishes so he may achieve as low a synchronizer failure rate as he wishes. It is also preferred that a designer be very generous with the synchronizers. Each of the synchronizers can actually be a unit triggered every half cycle of the receiving subsystem 36, or each can actually be two in parallel, triggered at the receiving system clock rate, with an extra latch in front of one to catch the sample a half cycle earlier. The output of the synchronizers is fed into circuitry 53 which is used to predict when to assert the new data signal 67, as will be described subsequently.

Figure 3:
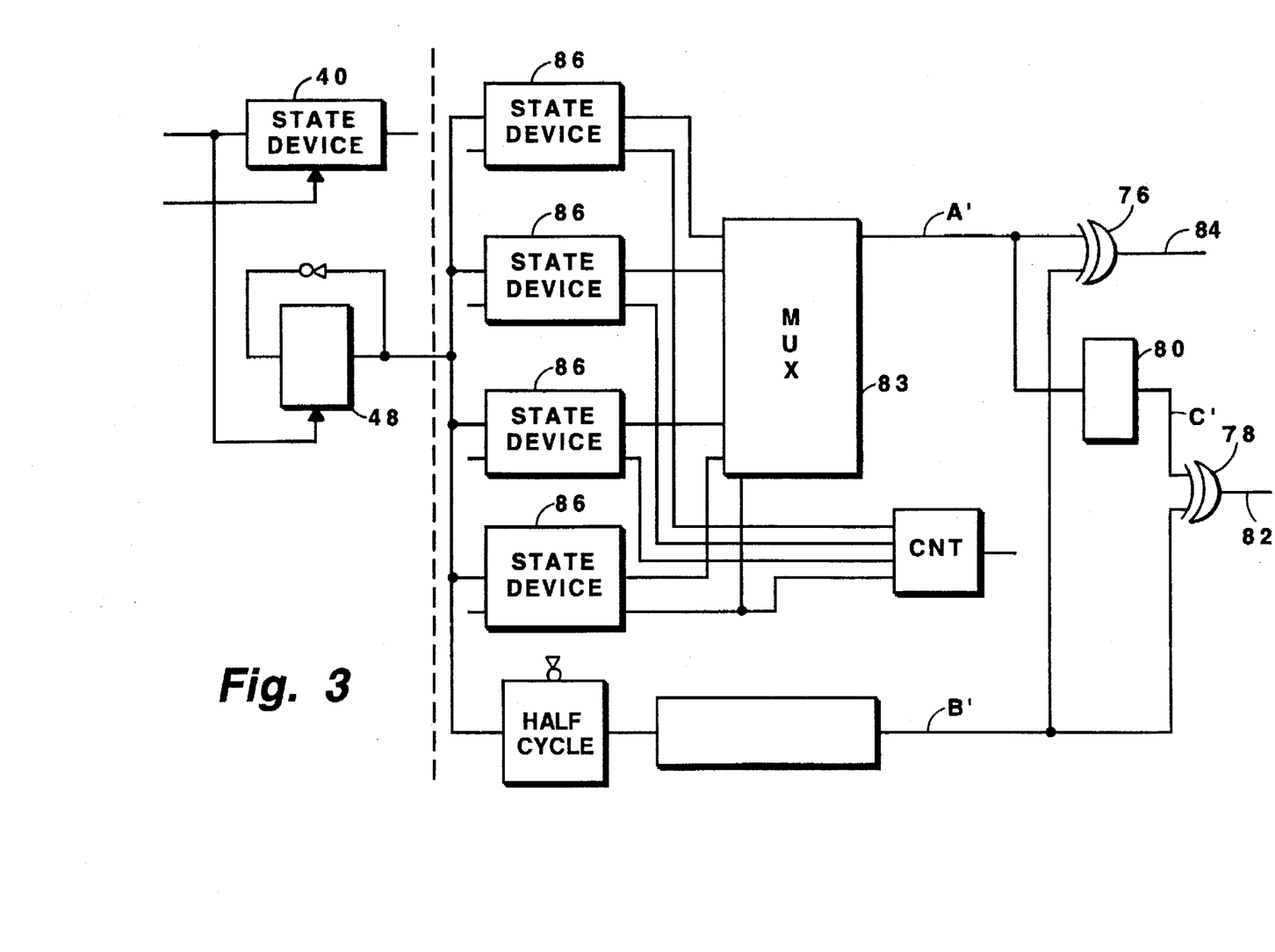
FIG. 3 is a block diagram of one of the synchronizers of FIG. 2.

Referring now to FIG. 3, at the output of each synchronizer (66, for example) are two XORs (numbered 76 and 78, respectively) and another state device 80 arranged to produce two signals on two lines. The synchronizer 66 is a barrel synchronizer.

A barrel synchronizer is a set of N state devices 86. The devices are loaded one at a time in round robin order with the input data. There is a MUX 83 that selects one state device at a time and transfers its state to the output. The selection of the state device by the mux is such as to make the delay through the barrel synchronizer as long as possible with the given number, N, of state devices. In operation, a state device samples its input on some receiving system clock event. Since the input signal could be changing at any time, this device may take a long time to resolve the logic state that it saw, i.e., it may go metastable. It is allowed N−1 receiving system cycles to restore its state before that state is presented to the output of the barrel synchronizer. Since there are N such state devices taking turns, the input is sampled every cycle and a potentially new value is output from the barrel synchronizer every cycle. But the time for a signal to propagate from input to output is N cycles.

A first signal line 82 is asserted if there was a state change in the sense register 48 detected in the second half of a receiving system cycle and a second signal line 84 is asserted if there is a state change in a sense register (48, for example) in the first half of a receiving system cycle. These 2 bits are presented for each register in the Circular buffer 38 (of FIG. 2) each full cycle of the receiving subsystem 36. These signals are called "event signals" (82 and 84) and can be associated with any register n in the circular buffer 38 and coming from either a sample of the sense register 48 taken at the end of a receiving system clock cycle or a half cycle before that. This provides the designer with the knowledge of when each register in the circular buffer 38 was loaded by the transmitting subsystem 34. Because there can be a very long delay in the synchronizers (possibly many cycles of either the receiving or transmitting system clocks), the indication that a register is loaded, as observed at the event signals 82 and 84, is long after it has actually happened.

The "maximum sense delay" can be defined as follows. If the sense register 48 changed state on a transmitting system clock event and its output is sampled by synchronizer 66 at a receiving system clock event that is later than that transmitting system clock event by the "maximum sense delay" or more, then the synchronizer 66 should see the new state of the sense register 48. The "maximum sense delay" is the worst case delay from clock to output for the sense register 48 plus the delay to propagate to the input of the synchronizer 66, and the setup time of the first state device 86 in the synchronizer 66. If the designer knows that the data observed the setup time of the synchronizer 66 then he knows with certainty what the output will be. The designer must also add to this the skew and jitter of both the transmitting system and the receiving system clocks.

The "minimum sense delay" can be defined as follows. If a sense register 48 changed state on a transmitting system clock event and its output is sampled by a synchronizer 66 at a receiving system clock event that is later than that transmitting system clock event by the "minimum sense delay" or less, then the designer can be certain that the synchronizer 66 will see the state of the sense register 48 before it changed, and it will therefore report that no state change happened in the half cycle before that receiving system clock event. The "minimum sense delay" is the minimum delay from clock to out for the sense register 48 plus the minimum delay to get to the input of the synchronizer 66, minus the hold time of the first state device 86 in the synchronizer 66. If the designer knows that the data observed the hold time of the synchronizer 66 then the designer knows with certainty what the output will be. The designer must also subtract from this the skew and jitter of both the transmitting system and the receiving system clocks. Interestingly, Minimum Sense Delay may be negative.

Referring again to FIG. 2, the Event Signals go into logic 53 that will have state devices in the path and hence be multiple cycles long, and finally the path leads to the "new data" signal 67 which causes the Receive Data Register 60 to capture data at the end of that receiving system cycle 62. When the design has been completed the designer can simply count registers (or latches) along the path to determine the delay, in cycles, from the front of a synchronizer that samples at the end of a cycle, through the synchronizer to become an Event Signal, on through the logic to become New Data 67, and finally to the clock event that captures data in the Receive Data Register 60. This starts with a receiving system clock event 62 and ends with a receiving system clock event 62. This number of cycles can be referred to as the "logic delay". Logic Delay is therefore always in units of receiving system clock cycles and it is always a whole number. The time through the similar path but starting at the input to the synchronizer that samples in the middle of a cycle is always "logic delay" plus one half receiving system cycles.

With synchronous systems, there is a regular rhythm in the transmitting subsystem 34 and the receiving subsystem 36. A transmitting system clock event 56 causes a sense register 48 to change state, and this finally causes the Receive Data Register 60 to capture data at a certain receiving system clock event 62. Knowing this, the present invention is used to predict when a data word 58 will be loaded into the circular buffer 38 and when to load the Receive Data Register 60. Such prediction requires as input the frequency and phase of the transmitting subsystem clock. Accordingly, the method of measuring these values is described next.

Figure 4:
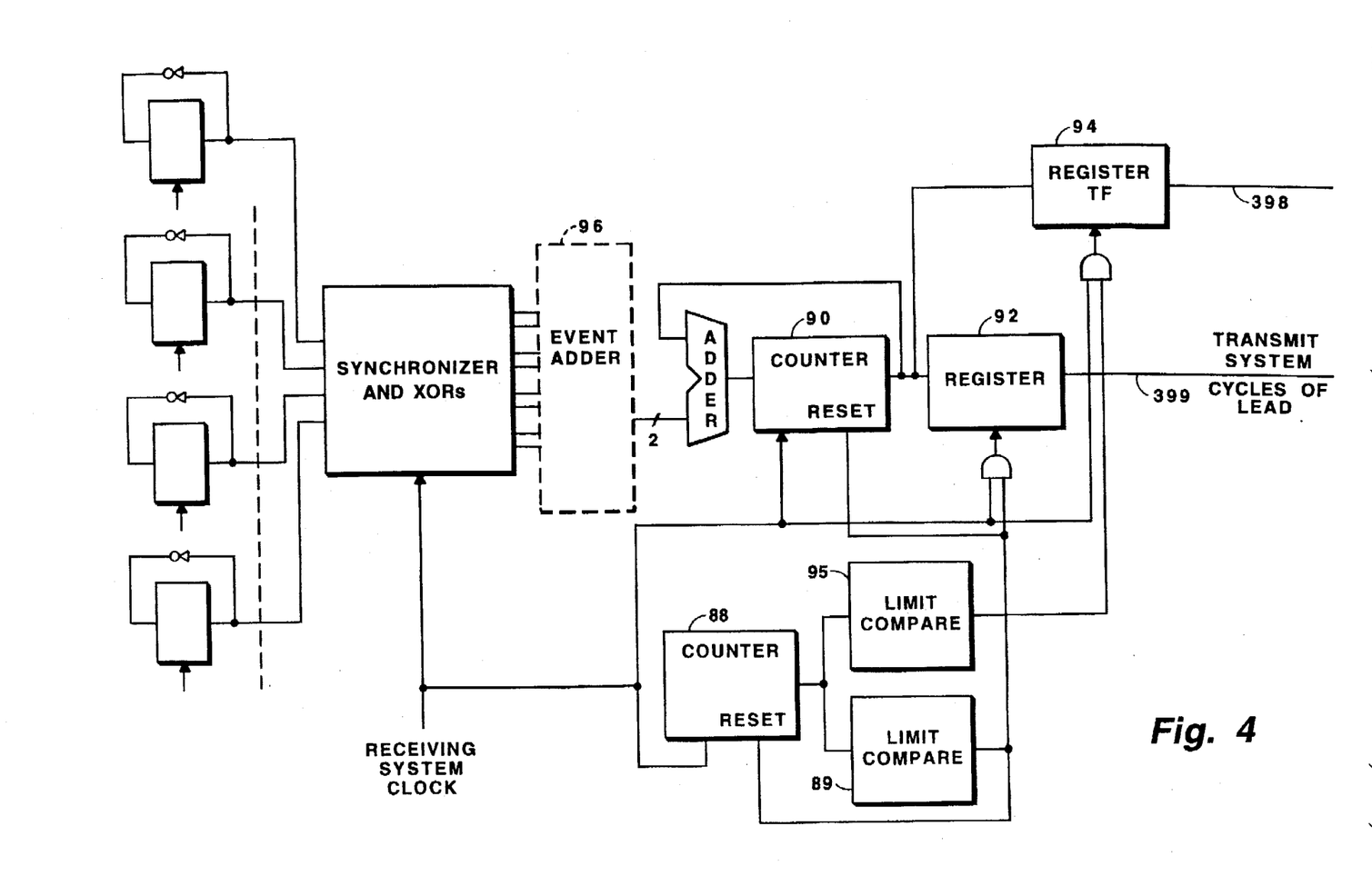
FIG. 4 is a block diagram showing the means by which the values TF and Transmit System Cycles of Lead are determined.

Referring to FIG. 4, the present invention must then determine a value for Transmit System Cycles of Lead and Transmit Frequency (hereinafter "TF"). A counter 88 is provided to determine counting intervals. Another counter 90 is provided that counts assertions of any Event Signal, hence determining how many transmitting subsystem clock cycles were observed during each counting interval.

The interval counter 88 has two limit comparators associated with it. It starts at zero and counts to a value defined by limit 89. This determines the end of one counting interval and also causes the counters 88 and 90 to reset to zero and begin the next counting cycle. There is a second limit comparator 95. This limit comparator 95 determines another counting interval shorter than the interval defined by limit comparator 89. The limit comparator 95 is set for the largest power of 2 less than the limit imposed by comparator 89. Comparator 89 defines a limit known as Receiving System Thirty-seconds Cycles of Lead. The exact value of this number will be described subsequently. It is approximately 32 times the logic delay.

At the time the counter 88 gets to Receive System Thirty seconds Cycles of Lead cycles, as determined by comparator 89, the contents of the counter 90 is loaded into the Transmit System Cycles of Lead register 92. Within this counting interval, the system also loads a TF register 94 with the event counts when counter 88 reaches the limit defined by comparator 95. TF represents the frequency ratio (transmit clock frequency/receive clock frequency) directly. The system then clears both counters 88 and 90 and starts over again.

The two registers: Transmit System Cycles of Lead 92, and TF 94 are pseudo static, i.e., their values hardly ever change and never by much. A good value is available in each of these registers always, in every cycle. They are almost constant.

The high order bits of Transmit System Cycles of Lead are not needed. Thus, the present invention will divide this by 32 (move the binary point 5 places left so this becomes a whole number plus 5 bits of fraction), add this to something and then take it modulo the size of the circular buffer 38 (of FIG. 2). If the circular buffer size is made to be a power of 2, like 4 for example, then the designer may take the Transmit System Cycles of Lead register modulo 4. In this case this register would have to be only 2 bits to the left of the binary point. It turns out, as will be described subsequently, to be convenient to keep one more high order bit, so the present invention in fact makes the Transmit System Cycles of Lead register 90 three bits to the left of the binary point. It then needs a total width of eight bits. The TF value is always a fraction because the transmit frequency is less than or equal to the receive frequency. It has an implied binary point just to the left of its most significant bit. It has the same number of bits as the limit value 95.

In the present invention, it is essential that the designer not overestimate the transmitting system frequency. Even in the worst case TF must underestimate the true ratio of transmitter clock frequency/receiver clock frequency. The value in Transmit System Cycles of Lead must likewise, even in the worst case, underestimate the true value. There are three effects which could possibly cause these values to be overestimated:

1) End effects: An optimally bad phase relationship between the clocks could result in counting up to 1 more count during the counting time interval than you would like.

2) There can be clock jitter and noise. This could cause an event that should have been outside the counting interval to be detected inside the counting interval. Call the clock jitter and noise expressed in transmit system clock periods $J_r$.

3) Either the transmitting system clock or the receiving system clock could be changing frequency. In this event, even though the event counting was right when it was done, by the time the values are used, the actual clock frequencies are different. No oscillator has perfectly stable frequency. The frequency of any oscillator will drift some, even if very little. In addition the designer may choose to design for correct operation during intentional slow variation of a clock frequency.

The designer must consider the difference between the current clock frequencies and the measured clock frequency value that is being used. A value will be used until it is replaced by a new value. Hence, the value being used could have been determined in a counting interval that started as much as two counting intervals ago. In addition it was measuring clock events that happened before that by the amount of the logic delay through the synchronizers and the logic all the way to the Receive Data Register (60 of FIG. 2). The designer should express this frequency difference in terms of the worst case number of extra transmit system clock periods that could have occurred during a counting period. Call this number $D_r$. If $n=1+(D_r+J_r)$ rounded up to an integer, then n will typically be 2, but it is possible that it could be a higher value in some designs. To compensate for potential overestimation of the transmitting system clock frequency the design should arrange that for counting events during the counting interval, we do not count the first n events that are seen.

The means by which the number of events to be added to counter 90 in each cycle is determined will now be described in more detail. This logic is represented by box 96 of FIG. 4. It is shown in detail in FIG. 5.

Figure 5:
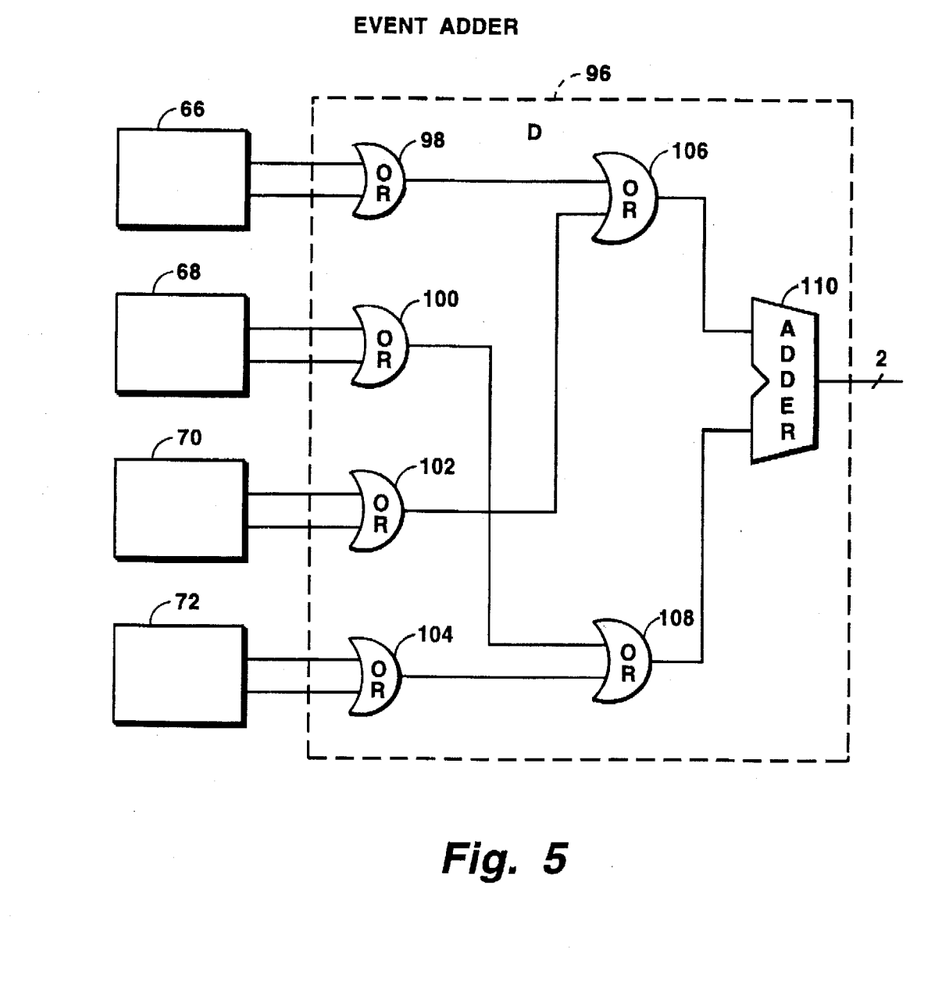
FIG. 5 is block diagram showing further detail of FIG. 4.

Referring now to FIG. 5, ideally, not more than one transmitting system clock event should be detected in a receiving system cycle. If that were exactly true, the eight outputs from the four synchronizers 66–72 could simply be "ORed" together to determine if a transmitting system event happened in this cycle or not. Unfortunately, it is sometimes possible, because of noise and other non-idealities, that two events could be observed in the same cycle.

The two event signals 82 and 84 of FIG. 3, belonging to the same event register, have mutually exclusive assertions so they can be "ORed" 98, 100, 102, and 104. In fact, if two events are seen in the same cycle, they would have to be in two circularly adjacent event registers. Hence, non-adjacent events from synchronizers 68 and 72 can also be "ORed" 108 from OR gate 100 and OR gate 104. Similarly, events from 66 and 70 can be "ORed" 106. This finally leaves two possible signals that could be asserted separately or simultaneously. They are added in a 1-bit adder 110 producing a 2-bit number as a result. The observed events this cycle could be 0,1,2. This number is added to the value in counter 90 (of FIG. 4) each cycle.

The present invention does not control the multiplexer 54 (of FIG. 2) in the data path directly from this logic. As was described above with reference to FIG. 2, the multiplexer 54 is controlled by a counter, the circular buffer read counter 64. The only connection to the data path is restricted to be the one signal "new data" 67. When this signal is asserted, the receive data register 60 captures data at the end of this cycle and the circular buffer read counter 64 increments at the end of this cycle. This provision guarantees that no data words are ever skipped, that the design never delivers the same data word twice, and that data words are delivered in the same order as they came in. As a matter of logical convenience, the present invention carries an additional high order bit with the circular buffer read counter 64. So, for example, if the Circular buffer 38 (of FIG. 2) has four registers the circular buffer read counter 64 is a 3 bit counter. Only the two low order bits control the multiplexer 54 but the circular buffer read counter 64 goes through eight states before repeating, i.e, 0, 1, 2, 3, 4, 5, 6, and 7.

Figure 7:
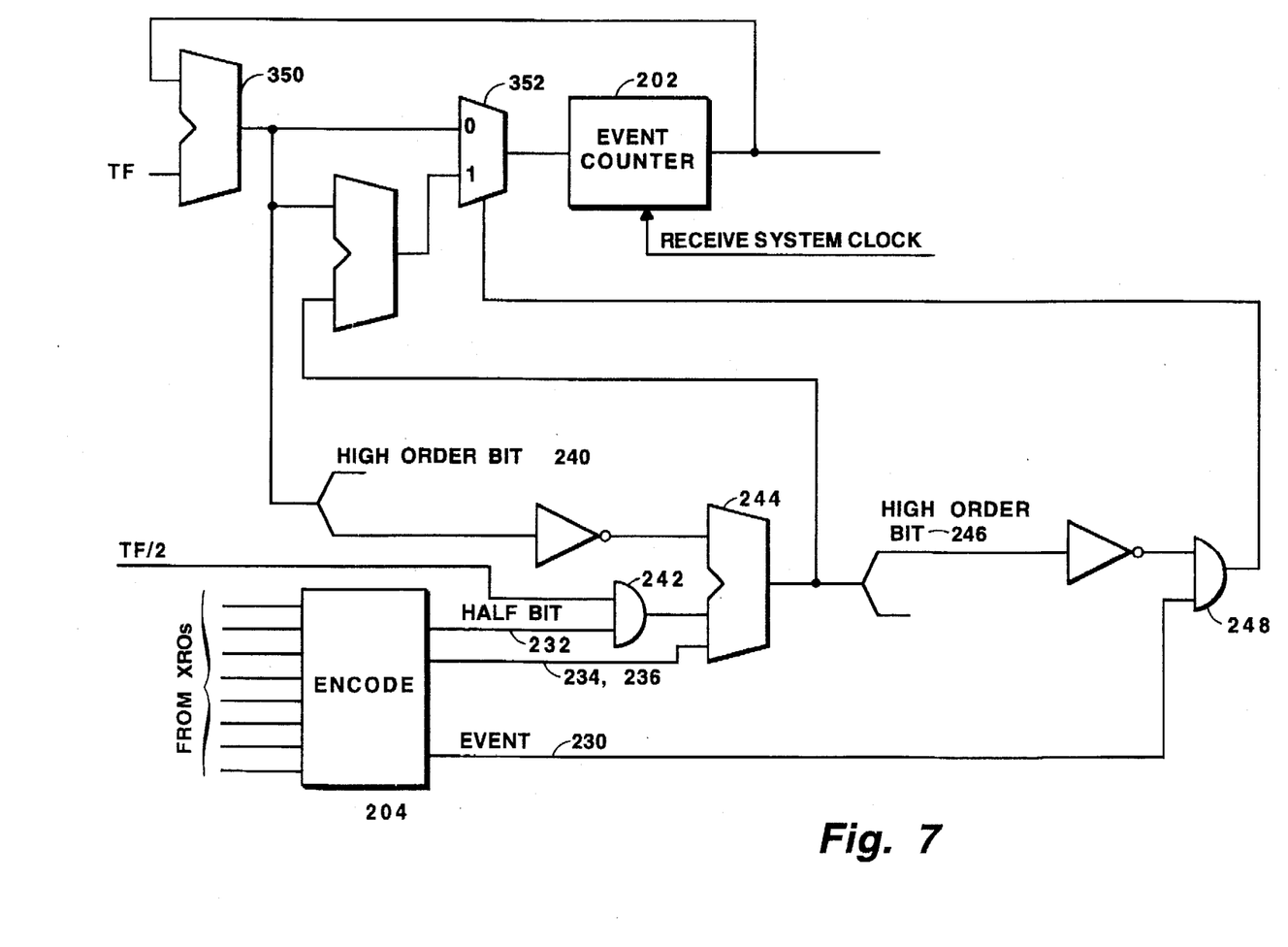
FIG. 7 is a block diagram detailing the event counter of FIG. 8.
Figure 8:
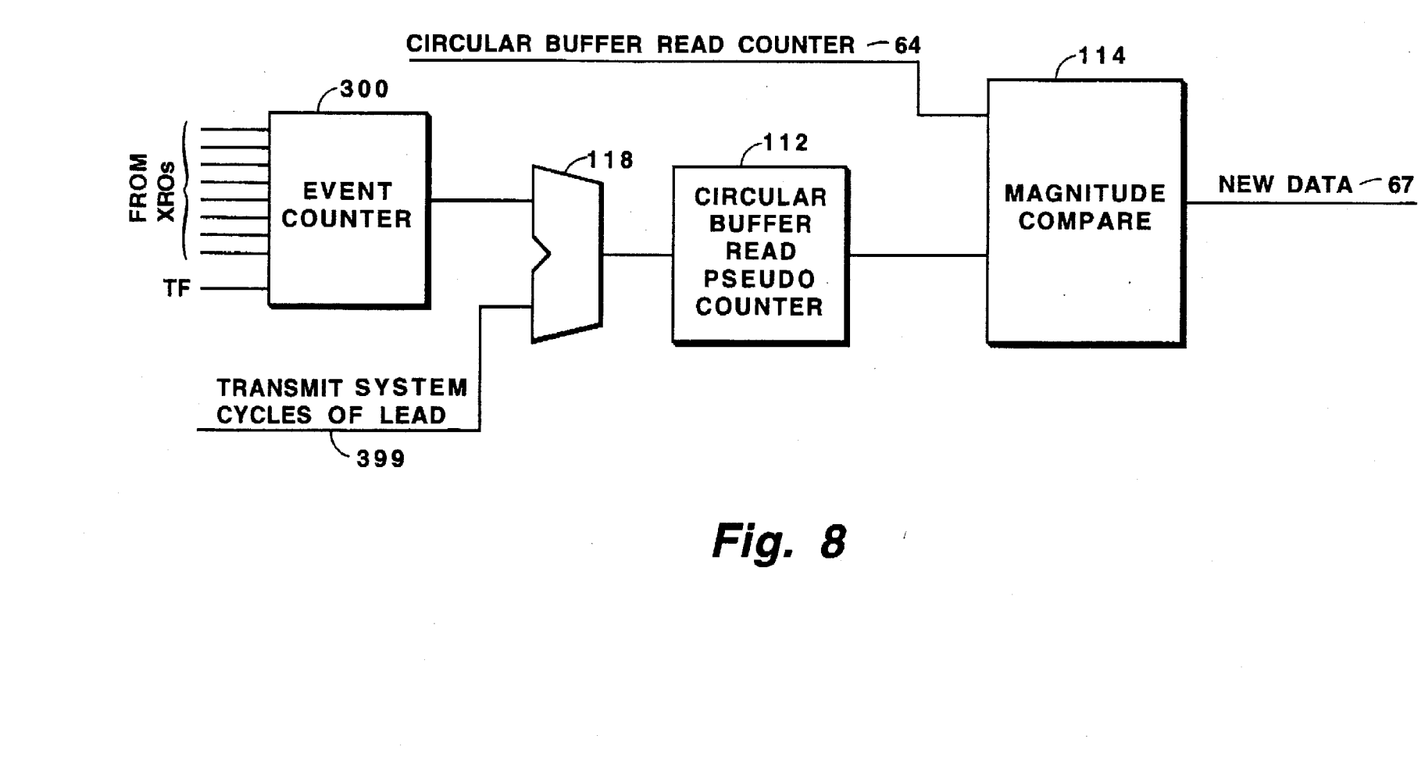
FIG. 8 is a block diagram showing the means by which the signal "new data" is determined in accordance with the present invention.

Referring back to FIG. 2, the circuitry 53 that generates the signal "new data" 67 consists of FIG. 4 and FIG. 8. The event counter 300 of FIG. 8 is detailed in FIG. 7. The encoder 204 of FIG. 7 is detailed in FIG. 6.

Figure 6:
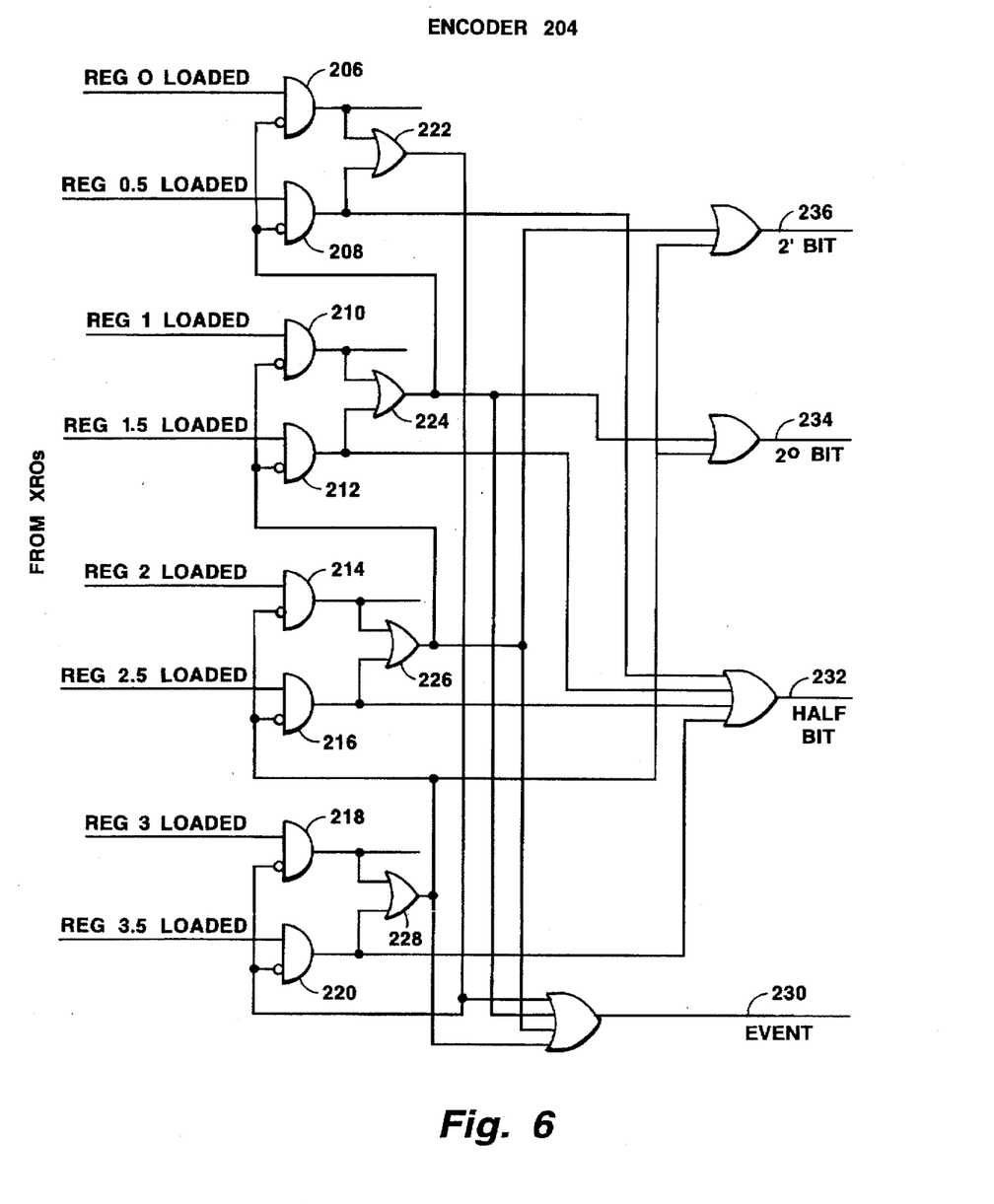
FIG. 6 is a block diagram detailing the encoder of FIG. 7.

Referring to FIG. 6, the encoder 204 gets its inputs from the eight XOR outputs from the synchronizers 66–72. The starting "AND" gates, labeled as 206–220, suppress signals from the event register n if there is a signal from the event register n+1. All eight signals are "ORed" together in OR gates 222, 224, 226, and 228, to make an EVENT signal 230. This event signal 230 is asserted if any event was detected in this cycle at all.

Another output of the OR gates 222, 224, 226, and 228 is called a half-bit 232. The half-bit 232 signal is asserted if the event was detected in the first half of the receiving system cycle and it is not asserted if the event was detected in the second half of the receiving system cycle.

The remaining two signals 234 and 238 from the OR gates 222, 224, 226, and 228, are a binary encoding of the event register number (0 to 3) from which the event was detected.

Referring to FIG. 7, TF 398 (of FIG. 4) is added to the current state of the event counter 202 to get the predicted next state of the event counter 202. But first this output is compared with the encoder 204 output. The event counter 202 has three bits to the left of the binary point, as well as fraction bits. The highest order bit 240 does not select an event register. The encoder 204 output is a whole number, no fraction, and is only 2-bits. Therefore, the high order bit 240 from the event counter 202 adder is not used to compare with the encoder 204 output. In addition, fraction bits must be supplied to go with the whole number from the encoder 204.

If half-bit 232 is unasserted, the fraction bits are forced to zero by an AND gate 242. If the half-bit 232 is asserted, then the value TF/2 is used for the fraction bits. It is just the value TF 398 (of FIG. 4) right shifted by one bit position so the highest order fraction bit is zero.

Having prepared the values from the encoder 204 and from the event counter adder 350 as described above, a subtraction is performed in adder 244. The predicted next value from the event counter 202 is subtracted from the encoder 204 value. A high order bit 246, which is the result of the subtraction, is now analyzed. The high order bit 246 is a sign bit of the subtraction result. If the high order bit 246 is "1" it means that the subtraction result is negative, i.e., the predicted next value for the event counter 202 is larger than the encode 204 value. In this case, the MUX 352 is steered to accept the predicted event counter value from adder 350 to load into the event counter 202. On the other hand, if the high order bit 246 is "0" it means that the subtraction result is positive and the encoder 204 value is larger than the predicted event counter 202 value. This is gated with the event signal 230 in an AND gate 248. If there was no event detected this will be nonsensical. But provided that there really was an event detected it means the event counter 202 should be kicked ahead to the encoder 204 value. The MUX 352 is steered to select the "1" input.

Referring now to FIG. 8, the circuitry 53 (of FIG. 2) provided, keeps a model of the circular buffer read counter 64, called a circular buffer read pseudo counter 112. The circular buffer read pseudo counter 112 is the same size as the circular buffer read counter 64. Thus, if the circular buffer 64 has four registers then the circular buffer read pseudo counter 112 has three 3 bits. A magnitude comparator 114 compares the values in the circular buffer read counter 64 and the circular buffer read pseudo counter 112. "New data" 67 of FIG. 2 and FIG. 8 is the output of this magnitude comparator 114 and is asserted in any cycle in which the value in the circular buffer read pseudo counter 112 is greater than the value in the circular buffer read counter 64. The extra bits are carried in these counters precisely to allow this magnitude comparison to be unambiguous. For 3 bit counters, leading by 1, 2, 3, or 4 is leading. Leading by 5, 6, or 7 is determined by the magnitude comparator 80 to actually be following.

The circular buffer read counter 64 follows the circular buffer read pseudo counter 112, but the circular buffer read counter 64 is always monotonic increasing in value by no more than one count per cycle, even if the circular buffer read pseudo counter 112 may jump around and sometimes go backwards and sometimes go forward by more than one count in a cycle.

The present invention now provides control of the circular buffer read pseudo counter 112. For this, we return to FIG. 7 which details the event counter 300, this time from a functional viewpoint. The event counter 202 of FIG. 7 has the same number of bits to the left of the binary point as the circular buffer read pseudo counter 112 (of FIG. 8). It has as many bits to the right of the binary point as the TF register 94 (of FIG. 4). In any given receive system cycle the Event Counter 202 represents the latest circular buffer register that has actually been seen to be loaded (through the synchronizers) with a precision down to a small fraction of a register. If the event counter 202 contains the number 2.000000, for example, it means that register two in the circular buffer 38 has been seen to be loaded. A number larger than two but less than three means register two was loaded sometime earlier than the latest possible time which would have been visible in this cycle and that we are progressing in time toward the time when the load of register three will be seen. The Event Counter 202 should not attain the value 3.00000 or larger until the load of register three has actually been detected. Control of the state of the Event Counter 202 is provided in the following manner. In the absence of any special situations, the TF register 94 (of FIG. 4) is added to the contents of the Event Counter 202 in each receiving system cycle in adder 350. TF represents the fraction of a transmitting cycle that passes during each receiving system cycle, so the Event Counter 202 should advance by that amount each cycle. This way it should be arriving at the next whole number just when we will in fact see that the corresponding register in the circular buffer has been loaded. This needs to be corrected from time to time however, so there are two special situations.

The first special situation occurs when the load of register N is detected in the second half of this cycle but the new value that the Event counter 202 will assume at the end of this cycle will be less than N, if we simply add TF to the state of the Event Counter 202 at the beginning of the cycle. Simply put, the Event Counter 202 is seen to be falling behind the real loading of circular buffer registers. In this case the state of the event counter 202 at the end of this cycle is set to exactly N.000000.

In the second special situation, the load of register N is detected in the first half of this cycle but the new value that the Event Counter 202 will assume at the end of this cycle will be less than (N+TF/2), if we simply add TF to the state of the event counter at the beginning of the cycle. Simply put, the Event Counter 202 is seen to be falling behind the real loading of circular buffer registers. In this case the state of the Event Counter 202 at the end of this cycle is set to exactly (N+TF/2).

It is possible with slight perturbations on the system that two register load events could possibly be detected in the same cycle, registers M and M+1, for example. It is the M+1 detected load that is of interest relative to this process. In this event the logic can suppress the signals relative to M. This is done in the encoder 204 logic that was described with reference to FIG. 6.

Since it is known with certainty that TF is less than transmitting clock frequency/receiving clock frequency, the Event Counter 202 will be advancing slightly more slowly than the real loading of circular buffer registers. If it was initially ahead, it will gradually lose its lead. It will gradually fall behind until one of the special situations previously described occurs on some event that will cause it to be "kicked ahead" a little to catch up. In normal operation, once we have passed the start up when the event count may initially find itself ahead, the Event Counter 202 will never be ahead of where the loading of circular buffer registers should be detected, except for clock jitter and noise.

A worst case scenario for the Event Counter 202 is that a circular buffer register load is ideally just after a synchronizer sampling time so that it should not be detected in this half cycle. However, due to clock jitter and noise, it turns out that the event is detected in this half cycle. Hence the Event Counter 202 gets "kicked ahead" at the end of the cycle when ideally it should not have reached that value yet. In this way the Event Counter 202 could get ahead of the value it should have by a time J, where J is clock jitter plus noise.

Another worst case scenario for the Event Counter 202 is that a circular buffer register load is ideally just before a synchronizer sampling time so that it should be detected in this half cycle. However, due to clock jitter and noise, it turns out that the event is not detected, causing it to be detected in the following half cycle instead. In this case we observe the event ½ receiving cycle+J later than we should. The Event Counter 202 was falling behind. At the very worst the Event Counter 202 will now be corrected to a value that is no more than ½ receiving cycle+J behind. If the transmitting clock period is $T_p$ receiving clock cycles, then the Event Counter 202 will not be corrected again for $T_p$ receiving cycles. The error in TF, known as $T_r$, is due to not counting the first n events when computing this value, and truncation error, plus an unfortunate end effect that could loose another event, plus noise and jitter and any possible change in clock frequencies between the time when TF was measured by counting events and when it is used to add to the Event Counter 202. Thus, by the time the Event Counter is corrected again it could fall behind another $(T_p * T_r)$ time. At the worst point, the Event Counter 202 could be behind by (½ receiving cycle+J+$(T_p * T_r)$).

The performance of the Event Counter 202 is typically much better than this. Typically the transmitting system clock period is at most a few receiving system cycles. TF has enough bits that $(T_p * T_r)$, the accumulated error in projecting the next event, is very small. In this case the Event Counter 202 falls behind only a very small amount between events. Also typically circular buffer load events occur at all sorts of receiving system clock phases. Under this condition, not too many cycles ago there was a circular buffer register load event quite near the latest time to be detected in the half cycle. In this event the Event Counter 202 got corrected to be quite near the correct value. An event occurring at the last possible instant to be detected in a half cycle will cause the Event Counter 202 to be corrected to exactly the right value, not behind at all. Since this happened not too many cycles ago, typically, the Event Counter 202 has not fallen behind much since then. Typically, the Event Counter 202 gets corrected only by a minority of events that are phased late in receiving system half cycles, and the Event Counter 202 stays much closer to the correct value than ½ receiving system clock cycle.

A bad case is a very low frequency transmitting system clock, few bits in TF, and a fixed phase relationship between the transmitting system clock and the receiving system clock. In this case, there is a high error in TF. It is many receiving system cycles between events, which accumulates a large error due to adding TF to the Event Counter 202 many times, and we do not get a supply of advantageously phased events. In this case we could approach the worst case performance calculated above.

In each cycle, the Event Counter 202 is added to the Transmit System Cycles of Lead register 92 value 399 (of FIG. 4) in adder 118. The result is loaded into the circular buffer read pseudo counter 112. For the case of four registers in the circular buffer, the circular buffer read pseudo counter 112 is a three bit register which gets the truncated whole number part of the Event Counter 202 plus the Transmit System Cycles of Lead 399, both of which carry fractions.

In normal behavior, the circular buffer read pseudo counter 112 would typically increment by one at a time, or stay the same in a cycle. There is a chance that it could have more complex behavior, however. There are conditions under which it could increment by two, and even a very unlikely chance that it could decrement.

Before continuing, a detailed look at the value "receiving system thirty seconds cycles of lead" must be described. This value is the number of receiving system cycles that constitutes a counting interval for determining "transmit system cycles of lead".

When a circular buffer register load event is detected by a synchronizer (66, for example) at the end of a cycle this information propagates through the synchronizer 66 and arrives at the Event Counter 202. At the Event Counter 202 suppose it results in "kicking the event counter ahead" to the next whole number. This flows through the adder 118 where "transmit system cycles of lead" is added to it and arrives at the circular buffer read pseudo counter 112. Suppose the result is that the circular buffer read pseudo counter 112 becomes one more than it was in the preceding cycle. This flows through the magnitude comparator 114 and results in assertion of the signal "new data" 67. In response to the assertion of New Data 67, the receive data register 60 (of FIG. 2) captures a data value at the end of the cycle. This activity started with a receive system clock event, when a synchronizer 66 captured a new event register value, and ended with a receive system clock event when the receive data register 60 captured a data value. The time between these two clock events is an integral number of receive system clock cycles and is called the "logic delay".

We could look at the corresponding activity that would start with a synchronizer detecting the load of a circular buffer register in the first half of a cycle. The time for this activity would be Logic Delay plus ½ receiving system cycles. This is compensated by the fact that the Event Counter 202, in this case, would be "kicked ahead" to a whole number+TF/2, instead of just to that whole number as in the former case.

It is to be emphasized that the "logic delay" can be determined exactly from the receiving subsystem design by simply counting state devices on the path that was described. It is independent of the transmitting subsystem design and of either clock frequency.

The transmitting subsystem 34 loads a data value in a circular buffer register 38 on a transmitting system clock event. This also loads an event register and this flows through the receiving subsystem 36 on the path just described and results in some data being captured in the receive data register 60 on a receive system clock event. The time from the transmitting system clock event to the receiving system clock event is at least (Logic Delay Cycles+ Minimum Sense Delay). The present invention uses this together with the value in the Event Counter 202 to determine which circular buffer register 38 is now ready to be read. To do this we must take account of the fact that the Event Counter 202 could, in fact, be ahead of were it should be by time J. In addition, we need additional time, Capture Delay, to get the data setup at the receive data register 60. Altogether we would be looking ahead in the circular buffer 38 a time given by: (Logic Delay*Receive Cycle Time+ Minimum Sense Delay−Capture Delay−J). The value of (Minimum Sense Delay−Capture Delay−J) needs to be expressed in thirty seconds of a receiving system clock cycle and rounded down; we must not over estimate Receiving System Thirty seconds Cycles of Lead. This is added to Logic Delay times 32 to yield the whole number "receiving system thirty seconds cycles of lead". This whole number is the number of receiving system cycles that constitutes the counting interval for determining "transmit system cycles of lead."

Note that it is particularly convenient if Minimum Sense delay−Capture delay is about 0 and J is also small. These values are naturally in nanoseconds, and they convert to receiving system cycles only if the receiving system clock frequency is fixed at design time. It is not at all surprising that the desirable situation is that the delay of getting the data to the receiving system should be matched by the delay of getting the sense signals to the receiving system.

Letting Logic Delay equal (Event Delay+Load Delay), Event Delay is the time from the synchronizer input to a resultant new value in the Event Counter 202. It is an integral number of receiving system cycles. Load Delay is the time from a new value in the Event Counter 202 to the clock event that captures a data value in the receive data register 60 as a result of that value. It is also an integral number of receiving system cycles.

Ideally, the Event Counter 202 is representing the point of progress in loading registers in the circular buffer 38, Event Delay receiving system cycles ago. Specifically, suppose the event counter 202 has the value X, where X is a whole number N+a fraction f. Then we can argue that in the worst case, circular buffer register N was loaded at least a time (Event Delay*Cycle Time+Minimum Sense Delay−J+ (f*transmit period)) ago. To see this, consider the last time that the Event Counter 202 was corrected. There are two cases. The first case is the loading of register M was detected in the second half of a cycle and the event counter 202 was set to M. The second case is the loading of register M was detected in the first half of a cycle and the event counter was set to (M+TF/2). We argue that the above condition was true at that time.

In the first case, when the Event Counter 202 attains the value M, the synchronizer 66, 68, 70, 72 saw an event in the Event register Event Delay cycles ago that represented the loading of register M. In order for this to have been seen, the register must actually have been loaded at least Minimum Sense Delay before that, but it could have been less due to jitter and noise, so it is known only to have been at least Minimum Sense Delay−J before that. At this time f is zero. So the assertion holds at this time.

In another case the value of f is TF/2. The Event Counter 202 attains the value M+TF/2 because a synchronizer 66, 68, 70, 72 saw a value in the event register Event Delay+½ cycles ago that represented the loading of register M. Again the register must have actually been loaded at least Minimum Sense Delay−J before that for this to occur. TF is known to be less than receive system period/transmit system period. One receive system period is therefore at least TF*transmit system period. So ½ receive system period is at least TF/2*transmit period. So the assertion holds at this time.

If the assertion held at the last time the Event Counter 202 was corrected, then it holds after that. Since the last time the Event Counter 202 was corrected, r receive system cycles have gone by. So the above assertion was true, but now it is r*receive period later and TF has been added to the value in the Event Counter 202 (r times).

At the last time the Event Counter 202 was corrected it was set to a value Y, where Y is a whole number M+a fraction g. At that point we had that register M had been loaded at least a time (Event Delay*Cycle Time+Minimum Sense Delay−J+g*transmit period) ago. Now it is r receiving system cycles later and therefore TF has been added to the Event Counter 202 r times. The Event Counter 202 now has the value X where X is a whole number N+a fraction f. We are looking at a register that was loaded N−M transmit cycles later. It is now r*receive period/transmit period transmit cycles later. Hence we can conclude that register N has been loaded at least a time (Event Delay*Cycle Time+Minimum Sense Delay−J+[g−(N−M)+r*receive period/transmit period]*transmit period) ago.

Since f=X−N, f=Y+r*TF−N, f=M+g+r*TF−N, f=g−(N−M)+r*TF. Thus, it is shown that Event Delay*Cycle Time+Minimum Sense Delay−J+f*transmit period is less than Event Delay*Cycle Time+Minimum Sense Delay−J+[g−(N−M)+r*receive period/transmit period]*transmit period, provided it can be shown that r*TF<r*receive period/transmit period. This is true since we know that TF is less than receive period/transmit period. This establishes that the condition is true.

By the time the value in the Event Counter 202 can cause data to be captured by the receive data register 60 an additional time, Load Delay*Cycle time will go by. The total time will be at least Logic Delay*Cycle Time+Minimum Sense Delay−J+f*transmit period.

A register must be loaded at least Capture Delay before its value may be captured in the receive data register 60. The excess time that register N was ready was at least Logic Delay*Cycle Time+Minimum Sense Delay−J+f*transmit period−Capture Delay.

During this time period more circular buffer registers were loaded. In fact, at least register number N+((Logic Delay*Cycle Time+Minimum Sense Delay−J+f*transmit period−Capture Delay)/transmit period) rounded down to an integer is now ready to have its value captured in the receive data register 60. This can be simplified to (N+f+(Logic Delay*Cycle Time+Minimum Sense Delay−Capture Delay−J)/Transmit Period) rounded Down to an integer, which is {X+(Logic Delay*Cycle Time+Minimum Sense Delay−Capture Delay−J)/Transmit Period) rounded down to an integer.

The above described design insures that "transmit system cycles of lead" is less than (Logic Delay*Cycle Time+Minimum Sense Delay−Capture Delay−J)/Transmit Period. It is therefore known that by this time circular buffer register number (X+Transmit System Cycles of Lead) rounded down to an integer is now ready to have its value captured in the receive data register 60, in the worst case. This is in fact the value that is captured according to this design.

Having described a preferred embodiment of the invention, it will now become apparent to those of skill in the art that other embodiments incorporating its concepts may be provided. It is felt therefore, that this invention should not be limited to the disclosed invention, but rather should be limited only by the spirit and scope of the appended claims.

What is claimed is:

1. A system for communicating between a transmitting system and a receiving system comprising:

a first clock in the transmitting system;

a second clock in the receiving system;

buffer means for providing storage for a plurality of data words, said buffer means including a plurality of state devices capable of accepting one of said plurality of data words and each corresponding to a plurality of one bit wide registers in a sensing device;

means, coupled to said buffer means, for providing a detected signal when said buffer means is loaded with a data word;

synchronizer means for synchronizing the detected signal when said buffer means is loaded with a data word;

means for providing a new data signal indicating that one of the plurality of data words has been loaded into said buffer means; and means for receiving the one of said plurality of data words from said buffer means in response to said generated new data signal.

2. The system according to claim 1 in which the synchronizing means includes a plurality of synchronizers each corresponding to said plurality of 1-bit registers in said sensing device.

3. The system according to claim 1 wherein the means for providing the new data signal representing the one of the plurality of data words has been loaded into said buffer means further comprises:

means for determining a cycles of lead for said transmitting system;

means for determining a transmit frequency to said receiving system;

means for generating said new data signal in response to said cycles of lead and said transmit frequency.

* * * * *